United States Patent [19]

Yazaki et al.

[11] 4,086,116
[45] Apr. 25, 1978

[54] CORRUGATED CARDBOARD SHEET AND METHOD FOR PRODUCING SAME

[75] Inventors: Takao Yazaki; Kazuhide Hattori, both of Yokkaichi, Japan

[73] Assignee: Mitsubishi Petrochemical Co., Ltd., Tokyo, Japan

[21] Appl. No.: 713,172

[22] Filed: Aug. 10, 1976

Related U.S. Application Data

[63] Continuation of Ser. No. 519,311, Oct. 30, 1974, abandoned.

[30] Foreign Application Priority Data

Oct. 30, 1973 Japan .......................... 48-125027[U]
Jan. 30, 1974 Japan .................................. 49-11773

[51] Int. Cl.$^2$ ............................ B31F 1/22; B31F 1/24
[52] U.S. Cl. ................................... 156/205; 156/210; 156/470; 156/244.21; 156/244.22; 156/244.23; 156/244.25
[58] Field of Search ........................... 156/205–210, 156/244, 470–473, 322, 332, 495, 462; 428/182, 186

[56] References Cited

U.S. PATENT DOCUMENTS

| | | | |
|---|---|---|---|
| 1,810,930 | 6/1931 | Sieg | 156/470 |
| 3,616,010 | 10/1971 | Dunholter | 156/210 |
| 3,811,987 | 5/1974 | Wilkinson et al. | 156/205 X |
| 3,849,224 | 11/1974 | Hintz et al. | 156/208 |
| 3,854,861 | 12/1974 | Worrall | 156/210 X |

FOREIGN PATENT DOCUMENTS 1,163,652  2/1964  Germany .............................. 156/205

Primary Examiner—David A. Simmons
Attorney, Agent, or Firm—Sughrue, Rothwell, Mion, Zinn and Macpeak

[57] ABSTRACT

An improved corrugated carboard sheet and a method for producing corrugated cardboard sheets of the type which utilize paper at least for either of the core sheet or the liner sheets, including feeding and shaping the core sheet into the desired corrugated configuration by using corrugating rolls, applying as the adhesive a film of a molten thermoplastic polymer to a face of the corrugated sheet, and pressing a liner sheet against the face of the core sheet covered with adhesive.

23 Claims, 2 Drawing Figures

CORRUGATED CARDBOARD SHEET AND METHOD FOR PRODUCING SAME

This is a continuation of application Ser. No. 519,311, filed Oct. 30, 1974, now abandoned.

BACKGROUND OF THE INVENTION

1. Field of the Invention

This invention relates to a method for producing corrugated cardboard sheets used for packaging or cushioning purposes, wherein all or part of the individual layers comprising the corrugated sheet are made of paper.

2. Description of the Prior Art

Corrugated cardboard sheets have been widely used for packaging purposes because of economy and ease of handling and transportation and because they possess a number of the requisite properties of a protective covering material.

Heretofore, a variety of types of corrugated cardboard sheets have been proposed and produced which are made from various materials, such as paper, plastics and other materials. In particular, a corrugated cardboard made of plastic is called a "plastic cardboard".

As is well known in the art, a typical construction of such corrugated cardboard sheets includes a corrugated core sheet bonded on both or either side to a flat-faced liner sheet. In the most simplified form, only one flat faced liner sheet is combined with the corrugated core sheet although a plurality of liner sheets may be combined with one or more core sheets to enhance the strength and cushioning effect.

Corrugated cardboard sheets using paper, however, have poor resistance to water and also are lacking in rigidity, and these factors mitigate against wider use of such corrugated cardboard sheets. This problem may arise due to the use of an aqueous starch paste as the adhesive for bonding the core sheet and the liner sheets since the use of an aqueous starch paste requires that the paper material possesses a sufficient water absorbing capability to facilitate bonding by the aqueous starch paste.

Recently, with increases in the operational speed of the corrugating machine, use of a paper material of a type having a higher degree of water absorption capability is desirable and this contributes to a lack of water resistance and rigidity in the finished product.

In order to improve the water resistance of the corrugated cardboard sheets using paper as the main component, attempts have been made to use, as the adhesive, plastic emulsion adhesives, aqueous polyvinyl alcohol adhesives, resorcin-formaldehyde denatured starch paste, hot-melt adhesives and the like.

However, the methods and the products of the prior art are not still satisfactory from the standpoint of water resistance, ease of handling and performance.

Another approach which has been used to improve the water resistance of corrugated cardboard sheets involves the application of wax coating to the faces of the corrugated core sheet and also the faces of the liner sheets. However, most of the commercially available water proofing corrugated cardboards are produced by dipping a sheet assembly of a core sheet and liner sheets which have been adhesively bonded with a water proofing starch paste into liquid wax to form coatings on the surfaces of the sheet assembly, and in using this process the wax coating does not penetrate to a sufficient extent into the portions of the sheet assembly corresponding to the surfaces of the core sheet meeting the liner sheets bonded by the starch paste.

Furthermore, the adhesive layer of starch paste itself does not possess sufficient resistance to water. As a result, water which passes between the surfaces of the core sheet meeting the liner sheets can easily penetrate into the starch paste layer and then into the paper sheets comprising the corrugated cardboard. This results in a drastic reduction of strength or, in the extreme case, a complete destruction of the cardboard structure.

Thus, prior art corrugated cardboard sheets using paper have limited resistance to water and also have some other inherent problems with respect to their physical properties.

A corrugated cardboard sheet using plastic is known and disclosed, for example, in U.S. Pat. No. 3,723,333. The corrugated cardboard sheet disclosed in this patent comprises a corrugated core sheet and one or more flat faced liner sheets both of which are made of plastic, the plastic core sheet being adhesively bonded to one of the respective plastic liner sheets with a plastic resin polymer having a melting point at least 10° C lower than the melting point of the plastic polymer comprising the core sheet and that of the liner sheets, thus providing a corrugated cardboard structure free of "warp" and "crookedness".

While a plastic cardboard sheet of this type provides better resistance to water, this plastic cardboard sheet does not provide to a sufficient degree the requisite properties of good cushioning or as a packaging material such as rigidity, compression strength, burst strength, printability and processing property as does a corrugated cardboard sheet using paper and is also too expensive to be a substitute for paper cardboard.

SUMMARY OF THE INVENTION

The present invention is directed toward the objective of overcoming the above described problems and providing an improved corrugated cardboard structure which is mainly constructed from paper and incorporates films of a thermoplastic polymer interleaved between the core sheet and the adjacent liner sheets for effecting reliable and firm bonding thereof, thus adding the advantageous features of films of thermoplastic polymers to a corrugated cardboard sheet using paper.

A primary object of the invention is to provide an improved corrugated cardboard sheet structure in which at least one of the core sheet and the liner sheets is constructed from paper and a film of a thermoplastic polymer is interposed between the adjacent faces of the core sheet and the liner sheets whereby the core sheet is adhesively bonded to the adjacent liner sheet.

Another object of the invention is to provide a method for providing water-resisting corrugated cardboard structures using paper as the primary material component, which utilizes films of thermoplastic polymers for the adhesive bonding of the liner sheets to the core sheet which has been shaped into the desired corrugated form by corrugating rolls, to produce a corrugated paper cardboard sheet having enhanced resistance to water.

Still another object of the invention is to provide a method wherein tension is controlled during the process of feeding and shaping the core sheet to the desired corrugated form for enhanced operational reliability and improved quality of the shaped core sheet.

A further object of the invention is to provide a method in which, after the corrugated core sheet is adhesively bonded to the flat faced liner sheets using films of thermoplastic polymers, the resulting sheet assembly is again pressed by a second pressure roll maintained at a well-controlled temperature, to enhance the bond strength.

In one embodiment, this invention provides a method for producing corrugated cardboard sheets comprising a corrugated core sheet and a liner sheet wherein at least either of the core sheet or the liner sheet is constructed from paper, the method comprising feeding and shaping a core sheet into the desired corrugated configuration, applying as the adhesive a film of a molten thermoplastic polymer to at least one side of the shaped core sheet as it is fed, and substantially simultaneously pressing a liner sheet to the adhesive applied side of the core sheet in a bonding zone as the core sheet is fed to bond the liner sheet and the core sheet by the interposition of the film of the molten thermoplastic polymer to form a corrugated sheet assembly.

Another embodiment of this invention provides a method for bonding a second liner sheet using a film of a molten thermoplastic polymer to a single faced corrugated sheet assembly comprising a corrugated core sheet and a liner sheet bonded to a side of the core sheet, comprising applying as an adhesive a film of a molten thermoplastic polymer to the side of the corrugated core sheet opposite the liner sheet bonded thereto and pressing a second liner sheet to the adhesive applied side of the corrugated core sheet to bond the second liner sheet to the corrugated core sheet between a pair of pressure rolls in which the pressure roll contacting the single faced sheet assembly is maintained at a surface temperature of about 100° to 180° C and the pressure roll contacting the second liner sheet is maintained at a surface temperature of about 40° to 120° C and is always maintained at a surface temperature of about 20° to 140° C lower than the surface temperature of the pressure roll contacting the single faced sheet assembly.

A further embodiment of this invention provides a method for producing corrugated cardboard sheets comprising a corrugated core sheet and liner sheets on the opposite sides of the core sheet wherein both the core sheet and the liner sheets are paper, the method comprising pre-heating a core sheet to a temperature of about 140° to 180° C, feeding the pre-heated core sheet to corrugating rolls and controlling the feeding rate using tension control rolls at a ratio to the peripheral speed of the corrugating rolls corresponding to the corrugation ratio as defined by the length of the core sheet prior to shaping divided by the length of the core sheet after shaping, shaping the core sheet using the corrugating rolls, feeding the shaped core sheet while retaining the shaped core sheet on the surface of one of the corrugating rolls using a vacuum acting from the inside of the corrugating roll, bonding a first liner sheet to the shaped core sheet by the interposition of a film of a molten thermoplastic polymer under a pressure provided by a first pressure roll maintained at a temperature of 90° to 140° C, the thermoplastic polymer comprising a thermoplastic polymer selected from the group consisting of polyethylene, polypropylene and an ethylene-propylene copolymer and the film being of such a size and in such a position that the edge portions of the film extend beyond the opposite edges of the single faced sheet assembly comprising the shaped core sheet and the first liner sheet and contact coatings of a silicone oil emulsion on the corresponding edge portions of the corrugating rolls and the edge portions of the pressure roll, again pressing and cooling the sheet assembly using a second pressure roll maintained at a temperature of 5° to 30° C, and bonding a second liner sheet to the opposite side of the shaped core sheet to the first liner sheet with a second film of a molten thermoplastic polymer by passing the second sheet and the single faced corrugated sheet assembly between a pair of pressure rolls in which the pressure roll contacting the second liner sheet is maintained at a temperature of 40° to 100° C below the temperature of the pressure roll contacting the single faced corrugated sheet assembly.

This invention also provides an apparatus for producing corrugated cardboard sheets comprising a core sheet and liner sheets on each surface of the core sheet wherein both the core sheet and the liner sheets are made of paper, comprising means for pre-heating and feeding a core sheet, means including corrugating rolls for shaping the core sheet, means for finely controlling the rate of feeding the core sheet to the corrugating rolls, means for retaining the shaped core sheet on the surface of at least one of the corrugating rolls, means for extruding a film of a molten thermoplastic polymer for bonding the shaped core sheet to a first liner sheet means for preheating the first liner sheet and feeding the first liner sheet into a position for press-bonding with the shaped core sheet means for press-bonding the preheated first liner sheet against the shaped core sheet to form a single faced corrugated sheet assembly by the interposition of the film of the molten thermoplastic polymer, means for again pressing the single faced corrugated sheet assembly of the shaped core sheet and the first liner sheet, means for cooling the single faced corrugated assembly, means for preheating the single faced corrugated sheet assembly, means for extruding a film of a molten thermoplastic polymer between the preheated single faced corrugated assembly and a second liner sheet, means for feeding the second liner sheet into a position for press-bonding with the side of the shaped core sheet of the single faced corrugated sheet assembly opposite the first liner sheet, and means for pressing the single faced corrugated sheet assembly against the second liner sheet and bonding the single faced corrugated sheet assembly to the second liner sheet; and a corrugated cardboard sheet structure comprising at least one core sheet shaped in a desired corrugated configuration and at least one liner sheet bonded to a side of the corrugated core sheet by means of a film of a thermoplastic polymer interposed between the liner sheet and the core sheet.

DETAILED DESCRIPTION OF THE INVENTION

The invention will now be further explained with reference to a preferred embodiment thereof which is illustrated in the accompanying drawings.

Figure 1:
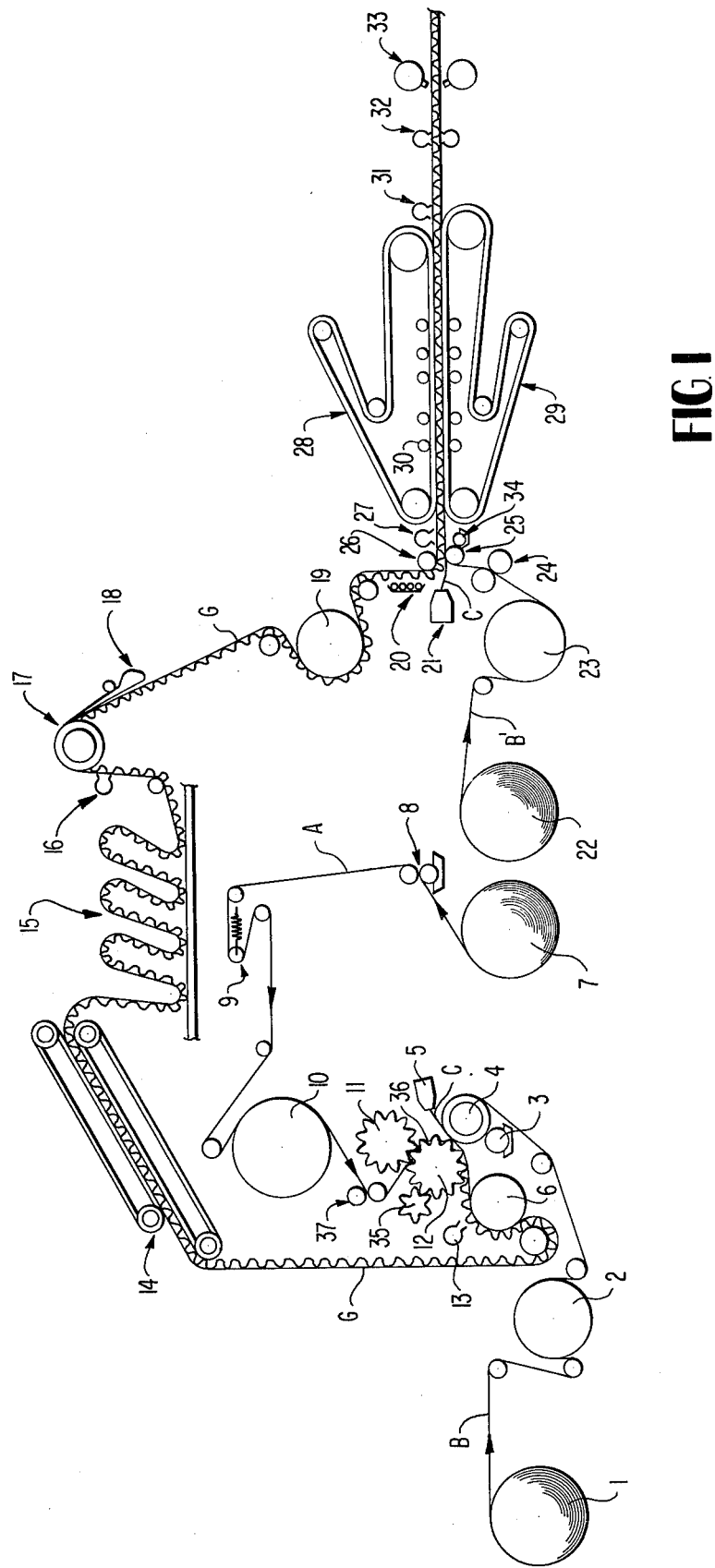
FIG. 1 is a diagrammatic side view showing a preferred embodiment of the invention.

Referring to FIG. 1, a flat-faced liner sheet B is withdrawn from a supply roll 1 and then passed over a pre-heating roll 2 to a pressure roll 4 while a core sheet A withdrawn from a supply roll 7 is passed through a moisture controller 8, over a tension roll 9 and to a pre-heating roll 10.

The core sheet A is then passed between a pair of fine tension control rolls 37 to a corrugating station wherein the core sheet is corrugated with the desired configuration by a pair of corrugating rolls 11 and 12. The corrugated core sheet is then combined with the liner sheet B by the interposition of a film of molten thermoplastic polymer C extruded from an extruder. Suitable configurations of the corrugation for the core sheet are defined in the standards of JIS Z-1516, etc., but, of course, it is to be emphasized that the configuration used in this invention is not limited to these standards only. A suitable pressure which can be employed for corrugating rolls 11 and 12 can generally range from about 20 to 100 kg/cm, preferably 50 to 80 kg/cm.

Corrugated cardboard sheets of the type to which this invention pertains utilize paper at least either for the core sheet or the liner sheets. The core sheet A and the liner sheets B, B' can be made of kraft paper, water-repelling paper, water-proofing paper, semi-chemical pulp paper, chemical pulp paper, ground pulp paper, straw pulp paper, jute, ordinary paper, and the like. When using a plastic material for the core sheet or the liner sheets, the material can be selected from polypropylene, polyethylene, ethylene-propylene copolymers, ethylene-vinyl acetate copolymers, polyvinyl chloride, polystyrene, combinations of such polymers with a filler such as talc or gypsum, and laminated sheets of these plastic compositions with water-repelling paper, water-proofing paper, kraft paper or jute, etc. As will be recognized the weights of the liner sheets and the core sheets which can be used in this invention will vary depending upon the end-use of the cardboard sheet produced, but are generally about 180 to 400 g/m$^2$ and about 125 to 250 g/m$^2$, respectively.

It is also possible to use sheets of metals or various paper sheets laminated with metallic foils. As the core sheet, semi-chemical pulp or plastic sheets laminated with semi-chemical pulp can also be employed.

In accordance with the invention, the film of the molten thermoplastic polymer used as the adhesive in the production of corrugated cardboard sheets in the manner described can be formed from a thermoplastic polymer resin. Essentially if the thermoplastic polymer can be melt-extruded and provides good adhesiveness, such a thermoplastic polymer can be used in this invention. Suitable extrusion temperatures for the thermoplastic polymers employed in this invention are preferably somewhat higher than those employed in conventional film-formation of thermoplastic polymers. More specifically, while the extrusion temperatures employed will vary depending on the thermoplastic polymer used, suitable extrusion temperatures which can be used in this invention can suitably range from about 250° to 340° C, preferably 300° to 310° C. A plastic composition selected from the materials in Group I below, which materials can be used either by themselves or in combination with the substances disclosed in the remaining Groups II to III can be used in this invention. The film of the polymer can have a thickness of from 0.01 to 1.0 mm, preferably 0.015 to 0.07 mm, and can be extruded in the molten state into the space between the core sheet and the liner sheet.

Group I: thermoplastic polymers such as polyethylene, polypropylene, ethylene-propylene copolymers, ethylene-vinyl acetate copolymers, polyvinyl chloride, polystyrene, polyvinyl alcohol, polyacrylonitrile, and other thermoplastic polymers, etc., and a mixture thereof;

Group II: resin tackifiers such as talloil rosin, wood rosin, petroleum resin, polyterpene, a terpene-phenol copolymer, pinene-phenol copolymers, etc.;

Group III: plasticizers such as DOP (dioctylphthalate), DBP (dibutylphthalate), a low molecular weight polyolefin, wax, etc.

For example, when polyethylene is selected from the first group, the polymer is preferably extruded in the form of a film at a temperature of 300° to 310° C and then placed between the meeting surfaces of the core sheet and the adjacent liner sheet.

The reason for using thermoplastic polymers as the adhesive film is that they are readily adapted to extrusion molding and lamination bonding to the sheet material which are suitable to continuous formation of the corrugated cardboard sheet, as well as providing good water-resistance to the sheet structure.

Polyolefin resins are particularly suited for use in the present invention because they have substantial ductility and thus are well-adapted for high speed manufacturing operations and also because of their low cost and sufficient resistance to shock so as to be able to withstand falling.

Of the olefin polymers, the preferred material is polyethylene which exhibits superior bondability to paper and extrudability, is economical and easily available, and is more readily adapted for high speed manufacturing operations.

The pre-heating roll 2 and the pressure roll 4 are maintained at about 70° to 150° C, preferably 90° to 140° C, whereby the liner sheet B is preheated to facilitate adherence to the film of the molten polymer C.

In shaping the core sheet into the corrugated form, the core sheet desirably is pre-heated at a rather high temperature. Therefore, the pre-heating roll 10 and the upper corrugating roll 11 are maintained at about 140° to 180° C.

The pre-heated core sheet is then introduced into the nip of the upper and lower corrugating rolls 11 and 12.

In the prior art system, that portion of the core sheet which enters the roll nip is subjected to a substantial amount of back tension provided by the pre-heating roll, guide rolls and other rolls, the amount of the back tension fluctuating widely. Such back tension often causes cracking, high-low, wrinkles of a corrugated sheet and collapse or misformation of the desired corrugation. Also, the corrugated core sheet after leaving the corrugating rolls tends to flattern easily and often tends to lose the corrugation prior to bonding to the liner sheet.

It has now been found by finely controlling and maintaining the tension of the core sheet within certain limits by the tension control device 37 that it is possible to produce a corrugated core sheet which is substantially free of cracking, high-low and wrinkles and which is also highly resistant to deformation after the shaping.

The tension control device 37 comprises a pair of metallic and rubber rolls whose peripheral speed can be adjusted to provide a ratio to the peripheral speed of the corrugating rolls of from about 1:1.45 to about 1:1.60, preferably from 1:1.52 to 1:1.55, approximating the corrugation ratio (calculated by the relationship: length of core sheet prior to shaping/length of core sheet after shaping).

The control rolls can be pre-heated and pre-heating of the control rolls is preferred.

In order to impart to the corrugated sheet the ability to more firmly and reliably retain the corrugated configuration after the shaping, the lower corrugating roll can be of the suction type as disclosed in British patent specification No. 565,370 which is operable to firmly retain the corrugated core sheet on the surface of the lower corrugating roll 12 by a vacuum pressure at least from the time the sheet leaves the upper corrugating roll until it reaches the surface of the pressure roll 4.

A retainer member such as a metallic finger as indicated by 36 can be provided to urge the core sheet against the surface of the corrugating roll 12.

In a manufacturing process of the type which includes coating starch paste on the convex top of the corrugated core sheet with a coating roll prior to application of the liner sheet, a sufficiently large spacing interval must be provided between the upper corrugating roll 11 and the pressure roll 4 so as to provide adequate installation space for the coating roll. This causes additional difficulties in retention of the core configuration.

The system according to the invention, however, eliminates the need for the coating roll and thus allows the spacing between the upper corrugating roll 11 and the pressure roll 4 to be reduced to such an extent that a greatly simplified retainer means is operable to effectively retain the core configuration of the sheet passing from the upper corrugating roll to the pressure roll.

It is preferred that the core sheet A, after being bonded to the liner sheet B by the interposition of the film of the molten thermoplastic polymer C, is again pressed on a second pressure roll 6.

After bonding of the core sheet to the liner sheet by the interposition of the film of the molten polymer by the action of the first pressure roll 4, the resulting laminated sheet assembly has to be retained appropriately compressed until the thermoplastic polymer solidifies sufficiently. This is accomplished by the second pressure roll 6 which by circulating water therein also serves to cool the laminated sheet structure of the core sheet and the liner sheet. A suitable pressure which can be employed between pressure roll 6 and corrugating roll 12 can generally range from about 10 to 50 kg/cm, preferably 25 to 40 kg/cm.

Preferably, an air knife 13 extending the full width of the laminated sheet structure is provided to promote the cooling.

The present embodiment further includes coating rolls, indicated at 3,34 and 35 in FIG. 1, which are made of felt, sponge, etc., and adapted to function in the manner described below.

When the film of the molten plastic polymer C is used for bonding the inner sheet B onto the surface of the core sheet A, the wall thickness of the film of the polymer near the edges tend to become increased due to the neck-in of the molten polymer, thus adversely affecting the performance.

The increased thickness portions of the polymer film (for example, 30 to 50 mm wide adjacent the opposite film edges in the case of polypropylene) often causes failure such as collapsing of the corrugation, thus leading to a significant amount of wasted material due to the necessity for edge trimming.

However, if the edges of the film of the molten polymer protrude beyond the opposite ends of the laminated material sheets, they may tend to stick and coil on the corrugating roll 12 and the pressure roll 4, creating a number of problems, such as misformation in the core sheet and poor bonding between the core sheet and the liner sheet.

In accordance with the invention, the above described problems are overcome by the use of coating rolls 3, 3' carrying coatings of a mold releasing agent for preventing the edge portions of the film of the molten polymer extending beyond the opposite ends of the laminated material sheets from sticking on and around these work rolls.

These coating rolls serve to transfer the coating of mold releasing agent onto the respective end portions of the work rolls intended to contact the thickened edge portions of the film of the molten polymer, thus preventing adhesion of the uncovered molten polymer portions on the surfaces of the work rolls.

Figure 2:
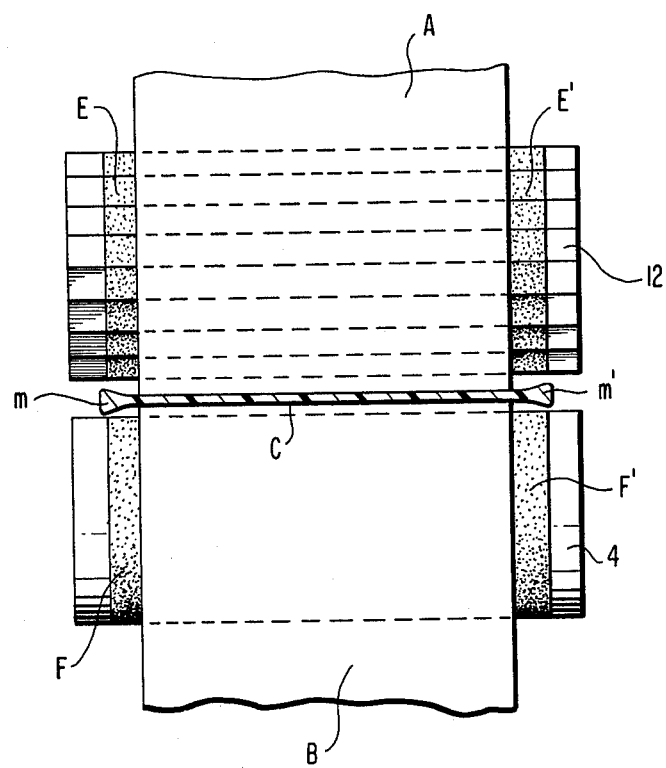
FIG. 2 is a diagrammatic view showing the stage of adhesive bonding effected between a corrugating roll and a pressure roll using a film of a molten plastic polymer.

Referring to FIG. 2, the coatings of mold releasing agent are applied to the opposite end portions of the pressure roll 4 and those of the lower corrugating roll 12 by a pair of plain cylindrical felt rolls 3,3' disposed in contact with the opposite end portions of the pressure roll and another pair of corrugated felt rolls 35,35' disposed in contact with the opposite end portions of the corrugating roll, respectively, to prevent adhesion of the uncovered end portions of the film of the uncured polymer C onto the roll surfaces.

These felt rolls have an axial dimension of about 20 to 100 mm and serve to transfer the coatings of the mold releasing agent only to the end portions E,E' of the corrugating roll 12 and to the end portions F,F' of the pressure roll 4. In this manner, the edge portions m,m' of the film of the molten polymer C which have been thickened due to the neck-in can be passed to the cooling roll 6 without any danger of sticking on the work rolls and cooled by the cooling roll 6 and the air knife 13 and a single faced corrugated cardboard sheet G thus formed is transferred to the subsequent station.

It should be noted that rolls constructed from asbestos, sponge, cloth, jute or any other material capable of being impregnated with a mold releasing agent will equally well function in a similar manner to the felt rolls.

In the illustrated embodiment, a 30% by weight diluted solution of silicone oil emulsion was used as the mold releasing agent. However, other mold releasing agents which can be used in this invention include inorganic oils and organic oils. Suitable examples of these oils are a mineral oil, a fatty oil, wax, etc.

The edge portions m,m' of the film of the molten polymer projecting from the ends of the single-faced cardboard sheet can preferably be cut off prior to the introduction to the double facing station although they can be sheared off at the final stage of the double facing step, if desired.

During test production, when the edges of the film of the molten polymer to be subjected to neck-in were placed between the core and liner sheets, material loss was a width of 100 mm for the 1000 mm wide sheet materials with the result that the effective width of the final sheet assembly was 900 mm.

In contrast, when the edges of the film of the molten polymer were extended outwardly beyond the opposite ends of the material sheets in accordance with the illustrated embodiment, the use of 1000 mm wide material sheets resulted in a 1000 mm wide final sheet assembly, i.e., no loss.

In both of the above described tests, the rates of the manufacturing operations were 60 m/min.

After being cooled by the cooling roll 6, the single faced sheet is passed over a guide roller and between guide belts 14 and to a bridge 15 which serves as a buffer for the differences between the operation speed of the previous single facer station and that of the subsequent double facer station.

The single faced sheet is then introduced to a moisture controller 16 wherein steam is applied to the sheet to provide the desired moisture content thereto, and passed through a positioner 17 acting to accurately position the sheet assembly with respect to the rollers contained in the subsequent forming station, and then to a pre-heating roll 19.

A balance weight 18 is provided to impose an appropriate amount of tension to the sheet assembly moving from the positioner 17 to the pre-heating roll 19.

The pre-heating roll 19 is maintained at about 100° C wherein the single-faced sheet is pre-heated from the side of the liner sheet. Following this, the sheet is also pre-heated from the opposite side containing the core sheet using, e.g., an infrared heater 20.

At the same time, a bottom liner sheet B' is withdrawn from a supply roll 22, pre-heated by a pre-heating roll 23 (maintained at about 80° to 160° C), and then guided between a support roll 25 and a pressure roll 26.

At this point, the bottom liner sheet is integrally bonded to the single faced corrugated sheet G by means of a film of molten thermoplastic polymer C emerging from an extruder 21.

During the double facing process, temperature control on the support and pressure rolls is quite critical because poorly controlled temperature causes warping or crookedness in the final sheet assembly, thus considerably impairing the quality of product. The bottom liner sheet B' and the single faced sheet G passing through the press bonding zone are unavoidably affected by heat from the extruder 21 located in the vicinity of the corresponding zone, the extruder being operable to extrude a film of a molten plastic polymer at a temperature, e.g., of about 300° to 310° C. In particular, because of the small mass and the flat faced configuration, of the bottom liner sheet B', the bottom liner sheet B' is more sensitive to such extreme temperature conditions.

In order to eliminate the above problem, the temperature of the support roll 25 contacting the bottom liner sheet B' preferably is maintained at a temperature substantially lower than the temperature of the pressure roll 26 acting on the single-faced sheet G so that a high quality final product without any warping and crookedness can be obtained.

Accordingly, the pressure roll 26 is usually maintained at about 100° to 180° C and the support roll 25 is maintained within a temperature range of about 40° to 120° C, providing a temperature difference between the pressure and support rolls ranging from about 20° to 140° C, preferably 40° to 100° C.

The double faced corrugated sheet thus formed is then cooled with cooling air from an air knife 27 and guided between felt belts 28 and 29 to the exit of the machine. The felt belts 28 and 29 are cooled by a suitable cooling system and also urged against the opposite sides of the sheet assembly by weight rolls 30 and 30' whereby the corrugated cardboard sheet is appropriately cooled and pressed to the desired extent.

A suitable pressure applied onto the single faced corrugated sheet assembly and the second liner sheet for the press-bonding exists when the clearance, "a", in millimeters, between the press bonding zone formed by pressure roller 26 and support roll 25 is adjusted so that the clearance generally ranges from about $a + 0.2$ mm to $a - 0.6$ mm, preferably from $a$ to $a - 0.2$ mm.

Subsequently, the corrugated sheet assembly is further cooled with a second air knife 31 and moisture-controlled by a moisture controller 32, if desired, and then cut to desired usable shorter lengths with a cutter 33.

Thus in accordance with the invention, an improved corrugated cardboard sheet and a method for producing same are provided wherein at least either of the core sheet and the liner sheets is constructed of paper and the remaining sheets are made of paper, plastic, or a laminated combination thereof, and in which the core sheet, after being shaped into the desired corrugated configuration, is press-bonded to the liner sheets by the interposition of films of thermoplastic polymer applied to the opposite faces of the core sheets as the adhesive, this arrangement offering many advantages, some of which are summarized below.

(1) The manufacturing process does not require heating, curing and drying steps for the adhesive as do the prior art systems using aqueous adhesives, and thus the heating plates used for such adhesive processing steps are omitted, resulting in an overall reduction in the size of the plant. Since the bonding step and the laminating step are combined into a single operation, the manufacturing procedure is greatly simplified as compared to conventional processes using a water-proofing paste or hot-melt adhesive. Also, any of a variety of kinds of corrugated cardboard sheets using paper, plastic and various combinations thereof can be produced on a single corrugating machine.

(2) The corrugated cardboard sheets produced in accordance with the invention have greatly improved resistance to water since the plastic polymer film serves as a perfect water-proofing adhesive which enables the use of a wider range of types of sheet materials, not just water-absorbing materials. For example, while chemical pulp has been used for the core sheet in most of the prior art corrugated cardboard sheets, it is possible in accordance with the invention to prepare the core sheet from inferior sheet materials, such as whole waste paper pulp treated with a sizing agent or plastics.

It has been found that a double-core corrugated cardboard sheet produced using a high rigidity and high strength sheet material for the core sheets in accordance with the invention can be a satisfactory substitute from the standpoint of strength for a tetra-cored corrugated cardboard sheet in the prior art, thus resulting in a substantial saving of material. In addition, the corrugated cardboard sheet of the invention provides many other enhanced properties including resistance to cold and heat and low cost.

Because of the existence of plastic polymer films incompatible with water, the corrugated cardboard sheet of the invention provides a high degree of water-imperviousness and, by impregnating it with wax, the rigidity and water-resistance thereof can be enhanced further.

(3) The plastic polymer films used as the adhesive in the corrugated cardboard sheet of the invention can be separated easily from the sheet materials comprising waste cardboard, which enables any scrap resulting to be readily reused.

While the above description has been with reference to the production of a single faced corrugated sheet assembly and a double faced corrugated sheet assembly, it will be apparent that the principles of this invention can be applied to the production of multiples thereof, e.g., assemblies in which two or more liner sheets are applied to the same side of a corrugated core sheet, assemblies in which two or more liner sheets are applied to both sides of a corrugated core sheet and assemblies which contain multiple layers of corrugated core sheets and liner sheets, for example, alternatingly. Such assemblies are generally produced to obtain increased physical properties, such as strength, resistance to deformation, increased cushioning, improved protection and the like.

More specifically, where it is desired to produce a single faced corrugated sheet assembly but having thereon multiple liner sheet layers, a single faced assembly produced as described hereinbefore and a second liner sheet can be passed, e.g., between pressure rollers or belts, a film of a molten thermoplastic polymer extruded therebetween and the second liner sheet press-bonded onto the previously applied first liner sheet of the single faced corrugated sheet assembly. Such a process can be repeated as desired to include additional liner sheet layers. Where an assembly which comprises two or more corrugated core sheets is desired, a double faced corrugated sheet assembly comprising a liner sheet on both sides of a corrugated core sheet produced as described above and a single faced corrugated sheet assembly comprising a liner sheet on one side of a core sheet are passed, e.g., between pressure rollers or belts, a film of a molten thermoplastic polymer extruded therebetween and the double faced corrugated sheet assembly and corrugated core side of the single faced corrugated sheet assembly press-bonded together. In such an instance it should be recognized that the corrugations of the two core sheets in such an alternating assembly can be oriented parallel to each other, perpendicular to each other or at an angle to each other by feeding the double faced corrugated sheet assembly and feeding the single faced corrugated sheet to the press-bonding zone with the corrugations of each assembly appropriately oriented with respect to each other.

As can be seen from the above, an additional advantage of this invention is that the method facilitates the production of such multiple corrugated cardboard assemblies. Where additional layers are desired, the above described techniques and procedures can be repeated as desired.

The following examples are given to illustrate the invention in greater detail.

EXAMPLE 1

A double-faced corrugated cardboard sheet was produced under the following operational conditions:

1. Sheet Material

Kraft pulp paper commercially available from Tokai Pulp Co., Ltd.

| Weight: | |
| --- | --- |
| Top liner sheet | 220 g/m$^2$ |
| Core sheet | 180 g/m$^2$ |
| Bottom liner sheet | 220 g/m$^2$ |

2. Adhesive

Low density polyethylene LH-31 produced by Mitsubishi Petrochemical Co., Ltd.

| | |
| --- | --- |
| MI: | 8 |
| Specific Gravity: | 0.918 |
| Extrusion Temperature: | 305° C |
| Extrusion Thickness: | 25 to 35 μ |

3. Forming Conditions

| | |
| --- | --- |
| Width of Sheets: | 1050 mm |
| Forming Speed: | 30 m/min |

In the single facing station:

| Roll Temperature: | |
| --- | --- |
| Core sheet pre-heating roll (10) | 150° C |
| Top liner sheet pre-heating roll (2) | 100° C |
| Upper corrugating roll (11) | 150° C |
| Lower corrugating roll (12) | 30 to 60° C |
| First pressure roll (4) | 130° C |
| Second pressure roll (6) | 30° C |

| Roll Pressure: | |
| --- | --- |
| Corrugating rolls (11, 12) | 50 to 80 kg/cm |
| First pressure roll (4) | 20 to 30 kg/cm |
| Second pressure roll (6) | 25 to 40 kg/cm |
| Vacuum Pressure of Bottom Corrugating Roll: | 260 mmHg |

In the double facing station:

| Roll Temperature: | |
| --- | --- |
| Single faced sheet pre-heating roll (19) | 100° C |
| Bottom liner pre-heating roll (23) | 100° C |
| Support roll (25) | 40 to 60° C |
| Pressure roll (26) | 100° C |
| Clearance between Support Roll and Pressure Roll: | 4.9 mm |
| Temperature of Felt Belts: | 20 to 60° C |
| Infrared Heater Used for Heating Top Single Faced Sheet: | 6 kw |

The properties of the corrugated cardboard sheet produced in the manner described above as compared to ordinary corrugated cardboard sheet produced in a conventional process are shown in the following Table 1.

TABLE 1

| Material | | Ordinary Sheet | | Sheet of the Invention | Notes |
|---|---|---|---|---|---|
| | Top Liner | K.280 | | K.220 | K:Kraft pulp paper |
| | Core | Scp.125 | | K.180 | Scp:Semi-chemical pulp paper |
| | Bottom Liner | K.280 | | K.220 | Number:Weight (g/m$^2$) |
| In a sheet form: weight | | 748 | | 700 | |
| | Bending Stiffness (Young's Modulus × Bending Moment) (kg·cm$^2$/cm) | Dry Wet | 100 Unable to measure | 103 380 | |
| | Flat Crush (kg/cm$^2$) | Dry Wet | 1.21 Unable to measure | 1.83 0.94 | |
| | End Crush (kg) | Dry Wet | 34.8 Unable to measure | 39.4 10.3 | |
| | Mulen Rupture Strength (kg/cm$^2$) | Dry Wet | 18.0 Unable to measure | 15.5 7.6 | JIS P-8131 |
| | Puncture Impact (kg·cm) | Dry Wet | 51.0 Unable to measure | 73.4 67.7 | JIS P-8134 |
| | Bonding Strength (kg) | Single facer side | Dry Wet | 16.6 1.3 | 16.1 5.7 | |
| | | Double facer side | Dry Wet | 20.9 1.5 | 18.7 5.2 | |
| | Amount of Coating (g/m$^2$) | | Weight of dry starch 15 | PE film 50 | Calculation: Total weight of final sheet - Weight of material sheets |
| In a box form: | | | | | |
| | Compressive Strength (kg/case) | Dry Water sprayed Wet | 320 47 Unable to measure | 370 337 87 | JIS Z-0212 Box dimension A-type 360 × 300 × 250mm |

Measuring Conditions:

| Dry: | 20° C | 65% RH |
|---|---|---|
| Wet: | After 20° C 1 hr water immersion | |

EXAMPLE 2

Samples of corrugated cardboard sheets were prepared employing the process of the invention by using the materials illustrated in Table 2 and a film of polyethylene having a thickness of 25 to 35 μ.

TABLE 2

| Sample Number | Method of Production | Materials |
|---|---|---|
| 1 | According to the invention | K220/Scp125/K220 |
| 2 | According to the invention | SK200/SK200/SK200 |
| 3 | According to the invention | SK200/SK200/B220 |
| 4 | Conventional | K200/Scp125/K200 |

Notes:
K: Kraft pulp paper
Scp: Semi-chemical pulp paper
SK: Water-proof Kraft pulp paper
Numbers: Weight (g/m$^2$)

Box samples were formed from the sheet samples and also from the conventional sheet and the compressive strengths of the box samples were measured with respect to (a) intact, (b) after water-spraying for 1 hour and (c) after water-immersion for 1 hour.

The test results obtained are shown in Table 3 which demonstrates great improvement in quality of the corrugated cardboard sheets of the invention.

1. Samples:
Box Type: A
Dimensions: 395 × 270 × 200 mm

2. Measuring Conditions

| Intact: | 20° C | 65% RH | 48 hrs |
|---|---|---|---|
| Water-spray: | 25 ± 10° C | | 1 hr |
| Water-immersion: | 23° C | | 1 hr |

TABLE 3

| Sample Number | Intact (kg/case) | Water-sprayed (kg/case) | Water-immersed (kg/case) |
|---|---|---|---|
| 1 | 330 | 182 | 26 |
| 2 | 620 | 508 | 93 |
| 3 | 590 | 389 | 71 |
| 4 | 340 | 95 | Unable to measure |

EXAMPLE 3

The fine tension control rolls were used for controlling the tension of the core sheet material prior to the introduction between the corrugating rolls 11 and 12, under the following operational conditions:

Control Roll Material:
Top roll: Neoprene rubber
Bottom roll: Metal (Chrome-plate)
Roll Surface Temperature:
Top roll: 60° to 130° C
Bottom roll: 150° C
Nip Pressure: 8 kg/cm
Roll Speed: 1.45 to 1.60 times the peripheral speed of corrugating rolls
Corrugating Rolls:
Shape of corrugation: A Flute (JIS Z-1516)

Corrugation Ratio: 1:1.53
Core Sheet Material:
Kraft pulp paper (commercially available from Toyo Pulp Co., Ltd.)
Weight: 180 g/m$^2$ The test results obtained were as follows.

When the tension control rolls were not operated, wrinkles, misformation, deformation, cracking and high-low were encountered in the core sheet because of undesired effect of tension variations caused by the pre-heating roll and the guide rolls used for the core sheet. On the contrary, when the tension control rolls were operative, any tension variations are eliminated, thus assuring reliable shaping of the core sheet without encountering any of the problems above described.

From the standpoint of stability in the shaping operation, the ratio of the speed of the tension control rolls to that of the embossing rolls should approximate the corrugation ratio.

In this example, a speed ratio of 1:1.52 to 1:1.55 has been found to be ideally suited for the purpose. It has also been found that speed ratios less than 1:1.52 create cracking whereas speed ratios greater than 1:1.55 result in wrinkles, high-low and misformation.

EXAMPLE 4

In order to confirm the effectiveness of the second pressure roll 6, samples were produced using the same paper material and thermoplastic resin as in Example 1 under the following conditions.

|  | First Pressure Roll 4 | Second Pressure Roll 6 |
| --- | --- | --- |
| Diameter (mm) | 254 | 313 |
| Surface Temperature (° C) | 90 to 130 | 30 |
| Nip Pressure with Lower Corrugating Roll (kg/cm) | 20 to 30 | 25 to 40 |
| Clearance with Respect to Lower Corrugating Roll (mm) | 0.3 | 0.15 |

The samples thus produced were examined using a pin-tester method according to JIS Z-0402. The test results obtained are shown in the following Table 4 which indicates that the second roll 6 substantially improved the bonding strength of the sheet by providing adequate pressure and cooling.

TABLE 4

|  | Temperature of Pressure Roll 4 | |
| --- | --- | --- |
|  | 90° C | 130° C |
| Bonding Strength of Samples Produced without Using Second Pressure Roll | 17.0 | 18.3 |
| Bonding Strength of Samples Produced Using Second Pressure Roll | 19.6 | 20.1 |

While the invention has been described in detail and with reference to specific embodiments thereof, it will be apparent to one skilled in the art that various changes and modifications can be made therein without departing from the spirit and scope thereof.

What is claimed is:

1. A method for producing corrugated cardboard sheets comprising a corrugated core sheet and a liner sheet wherein at least either of the core sheet or the liner sheet is constructed from paper, said method comprising feeding and shaping a core sheet into the desired corrugated configuration, extruding a continuous film of a molten thermoplastic polymer, feeding the extruded continuous film of molten thermoplastic polymer through free space at a rate which is substantially equal to the production rate of the shaped core sheet, applying as the adhesive said film of extruded continuous molten thermoplastic polymer to at least one side of the shaped core sheet as said shaped core sheet is fed, and substantially simultaneously pressing in a bonding zone a liner sheet to said adhesive applied side of the shaped core sheet as said shaped core sheet is fed to bond said liner sheet and said core sheet by the interposition of said film of the molten thermoplastic polymer to form a corrugated sheet assembly.

2. The method as claimed in claim 1, wherein said shaping is using corrugating rolls and wherein the method includes retaining the shaped core sheet after shaping into the corrugated configuration on the surface of the corrugating roll using a vacuum until the core sheet reaches the bonding zone with the liner sheet.

3. The method as claimed in claim 1, wherein said shaping is using corrugating rolls and wherein the method includes retaining the core sheet after shaping into the corrugated configuration using a retainer member on the surface of the corrugating roll until the core sheet reaches the bonding zone with the liner sheet.

4. The method as claimed in claim 1, wherein said shaping is using corrugating rolls and wherein the method includes retaining the core sheet after shaping into the corrugated configuration on the surface of the corrugating roll using a vacuum provided through apertures formed in the surface of said corrugating roll in conjunction with a retainer member until the core sheet reaches the bonding zone with the liner sheet.

5. The method as claimed in claim 1, wherein said thermoplastic polymer is selected from the group consisting of polyethylene, polypropylene, an ethylene-propylene copolymer, an ethylene-vinylacetate copolymer, polyvinyl chloride, polystyrene, polyvinyl alcohol, polyacrylonitrile and a mixture thereof.

6. The method as claimed in claim 5, wherein said thermoplastic polymer is selected from the group consisting of polyethylene, polypropylene, an ethylene-propylene copolymer, an ethylene-vinyl acetate copolymer and a mixture thereof.

7. The method as claimed in claim 1, wherein said film of molten thermoplastic polymer comprises the combination of (a) a thermoplastic polymer selected from the group consisting of polyethylene, polypropylene, an ethylene-propylene copolymer, an ethylene-vinyl acetate copolymer, polyvinyl chloride, polyvinyl alcohol, polyacrylonitrile and a mixture thereof; and (b) at least one of a resin tackifier and a plasticizer.

8. The method as claimed in claim 7, wherein said thermoplastic polymer is selected from the group consisting of polyethylene, polypropylene, an ethylene-propylene copolymer, an ethylene-vinyl acetate copolymer and a mixture thereof.

9. The method as claimed in claim 1, wherein the shaping is using corrugating rolls and the rate of feeding the core sheet to said corrugating rolls is controlled at a ratio of about 1:1.45 to 1:1.60 to the peripheral speed of said corrugating rolls using fine tension control rolls.

10. The method as claimed in claim 9, wherein said ratio ranges from 1:1.52 to 1:1.55.

11. The method as claimed in claim 1, wherein the shaping is using corrugating rolls and the rate of feeding the core sheet to said corrugating rolls is controlled using fine tension control rolls at a ratio to the peripheral speed of said corrugating rolls corresponding to the corrugation ratio as defined by the length of the core sheet prior to shaping divided by the length of the core sheet after shaping.

12. The method as claimed in claim 1, wherein the shaping is using corrugating rolls and the pressing of the liner sheet to the corrugated core sheet is between one of said corrugating rolls and a first pressure roll maintained at a temperature of about 70° to 150° C and wherein the method includes additionally pressing and cooling the resulting sheet assembly using a second pressure roll maintained at a temperature of below about 60° C.

13. The method as claimed in claim 12, wherein said first pressure roll is maintained at a temperature of 90° to 140° C and said second pressure roll is maintained at a temperature of 5° to 30° C.

14. The method as claimed in claim 12, wherein said thermoplastic polymer is selected from the group consisting of polyethylene, polypropylene, an ethylene-propylene copolymer, an ehtylene-vinyl acetate copolymer and a mixture thereof.

15. The method as claimed in claim 12, wherein the rate of feeding the core sheet to said corrugating rolls is controlled by tension control rolls at a ratio to the peripheral speed of said corrugating rolls ranging from about 1:1.45 to 1:1.60.

16. The method as claimed in claim 15, wherein said thermoplastic polymer is selected from the group consisting of polyethylene, polypropylene, an ethylene-propylene copolymer, an ethylene-vinyl acetate copolymer and a mixture thereof.

17. The method as claimed in claim 1, wherein said shaping is using corrugating rolls and said pressing is using a pressure roll and the applying of said film of the molten thermoplastic polymer is such that the edge portions of said film extend outwardly beyond the opposite edges of the resulting sheet assembly comprising the core sheet and the liner sheet bonded to the core sheet by said film of said thermoplastic polymer and wherein the method includes coating a mold releasing agent on the edge portions of said pressure roll and at least one of said corrugating rolls corresponding to the edge portions of said film by transfer of said mold releasing agent from coating rolls impregnated with said mold releasing agent, and, after cooling, removing said edge portions of said film of said thermoplastic polymer from sheet assembly.

18. The method as claimed in claim 1, including additionally applying at least one additional liner sheet to the liner sheet of said corrugated sheet assembly as said corrugated sheet assembly is fed by applying a film of a molten thermoplastic polymer to the surface of the liner sheet of said corrugated sheet assembly and pressing said additional liner sheet to said corrugated sheet assembly to bond said additional liner sheet to said liner sheet of said corrugated sheet assembly.

19. A method for bonding a second liner sheet using a film of a molten thermoplastic polymer to a single faced corrugated sheet assembly comprising a corrugated core sheet and a liner sheet bonded to a side of said core sheet, comprising applying as an adhesive a film of a molten thermoplastic polymer to the side of the corrugated core sheet opposite the liner sheet bonded thereto and simultaneously pressing a second liner sheet to said adhesive applied side of said corrugated core sheet to bond said second liner sheet to said corrugated core sheet between a pair of pressure rolls in which the pressure roll contacting said single faced corrugated sheet assembly is maintained at a surface temperature of about 100° to 180° C and the pressure roll contacting the second liner sheet is maintained at a surface temperature of about 40° to 120° C and is always maintained at a surface temperature of about 20° to 140° C lower than the surface temperature of said pressure roll contacting said single faced corrugated sheet assembly.

20. The method as claimed in claim 19, wherein said pressure roll contacting the second liner sheet is maintained at a surface temperature 40° to 100° C lower than the surface temperature of said pressure roll contacting the single faced corrugated sheet assembly.

21. The method as claimed in claim 19, including additionally applying at least one additional single faced corrugated assembly comprising a corrugated core sheet having a liner sheet bonded to one surface of said corrugated core sheet to said double faced core assembly by applying a film of a molten thermoplastic polymer to one surface of said double faced core assembly as said double faced core assembly is fed and substantially simultaneously pressing the corrugated core sheet side of said additional single faced corrugated core assembly to said adhesive applied surface of said double faced corrugated assembly to form an assembly with multiple corrugated cores and liner sheets.

22. A method for producing corrugated cardboard sheets comprising a corrugated core sheet and liner sheets on the opposite sides of a core sheet wherein both the core sheet and the liner sheets are paper, said method comprising pre-heating a core sheet to a temperature of about 140° to 180° C, feeding said pre-heated core sheet to corrugating rolls and controlling the feeding rate using tension control rolls at a ratio to the peripheral speed of the corrugating rolls corresponding to the corrugation ratio as defined by the length of the core sheet prior to shaping divided by length of the core sheet after shaping, shaping said core sheet using said corrugating rolls, feeding said shaped core sheet to a bonding zone while retaining said shaped core sheet on the surface of one of said corrugating rolls using a vacuum acting from the inside of said corrugating roll, bonding a first liner sheet to said shaped core sheet by the interposition of a film of a molten thermoplastic polymer under a pressure provided by a first pressure roll maintained at a temperature of 90° to 140° C, said thermoplastic polymer comprising a thermoplastic polymer selected from the group consisting of polyethylene, polypropylene, an ethylene-propylene copolymer, an ethylene-vinyl acetate copolymer and a mixture thereof and said film being of such a size and in such a position that the edge portions of said film extend beyond the opposite edges of the single faced sheet assembly comprising said shaped core sheet and said first liner sheet and contact coatings of silicone oil on the corresponding edge portions of said corrugating rolls and the edge portions of said pressure roll, again pressing and cooling the sheet assembly using a second pressure roll maintained at a temperature of 5° to 30° C, and bonding a second liner sheet to the opposite side of the shaped core sheet to the first liner sheet with a second film of a molten thermoplastic polymer by passing said second liner sheet and said single faced sheet assembly between a pair of pressure rolls in which the pressure roll contacting said second liner sheet is maintained at a temperature of 40° to 100° C below the temperature of the pressure roll contacting said single faced sheet assembly.

23. An apparatus for producing corrugated cardboard sheets comprising a core sheet and liner sheets on each surface of the core sheet wherein both the core sheet and the liner sheets are made of paper, comprising
means for pre-heating and feeding a core sheet,
means including corrugating rolls for shaping said core sheet,
means for finely controlling the rate of feeding said core sheet to said corrugating rolls,
means for retaining said shaped core sheet on the surface of at least one of said corrugating rolls,
means for extruding and feeding through free space a first continuous film of a motlen thermoplastic polymer for bonding said shaped core sheet to a first liner sheet,
means for pre-heating said first liner sheet and feeding said liner sheet into a position for press-bonding with said shaped core sheet,
means for press-bonding said pre-heated first liner sheet against said shaped core sheet to form a single faced corrugated sheet assembly by the interposition of said first continuous film of molten thermoplastic polymer,
means for again pressing the single faced corrugated sheet assembly of said shape core sheet and said first liner sheet,
means for cooling said single faced corrugated sheet assembly,
means for pre-heating said single faced sheet assembly,
means for extruding and feeding through free space a second continuous film of a molten thermoplastic polymer between said pre-heated single faced corrugated sheet assembly and a second liner sheet,
means for feeding said second liner sheet into a position for press-bonding with the side of said shaped core sheet of said single faced corrugated sheet assembly opposite said first liner sheet, and
means for press-bonding said single faced corrugated sheet assembly against said second liner sheet to form a double faced corrugated sheet assembly by the interposition of said second continuous film of molten thermoplastic polymer.

* * * * *